(12) United States Patent
Meurant et al.

(10) Patent No.: US 12,174,942 B2
(45) Date of Patent: Dec. 24, 2024

(54) PROTECTION METHOD, COMPUTER PROGRAM PRODUCT AND ASSOCIATED SYSTEMS

(71) Applicant: Schneider Electric Industries SAS, Rueil Malmaison (FR)

(72) Inventors: Olivier Meurant, Saint Martin d'Heres (FR); Florent Aubert, Crolles (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 269 days.

(21) Appl. No.: 17/512,919

(22) Filed: Oct. 28, 2021

(65) Prior Publication Data
US 2022/0138315 A1    May 5, 2022

(30) Foreign Application Priority Data

Nov. 2, 2020  (FR) .................................. 2011213

(51) Int. Cl.
*G06F 21/54*     (2013.01)
*G06F 21/64*     (2013.01)
*H04L 9/32*      (2006.01)

(52) U.S. Cl.
CPC .............. *G06F 21/54* (2013.01); *G06F 21/64* (2013.01); *H04L 9/3247* (2013.01)

(58) Field of Classification Search
CPC .......... G06F 21/54; G06F 21/64; G06F 21/30; H04L 9/3247; H04L 2209/805; Y04S 40/20; H04W 12/06
See application file for complete search history.

(56) References Cited

U.S. PATENT DOCUMENTS

| | | |
|---|---|---|
| 2011/0184585 A1 | 7/2011 | Matsuda et al. |
| 2013/0036311 A1 | 2/2013 | Akyol et al. |
| 2017/0180137 A1* | 6/2017 | Spanier ................. H04L 9/3247 |
| 2018/0159691 A1* | 6/2018 | Akyol ..................... G06F 21/44 |
| 2021/0176073 A1* | 6/2021 | Spanier ................. H04L 9/3236 |

OTHER PUBLICATIONS

Seo, Jung Taek, "Towards the advanced security architecture for Microgrid systems and applications", Journal of Supercomputing, vol. 72, No. 9, Jun. 21, 2016, pp. 3535-3548.
French Search Report and Written Opinion dated Jun. 22, 2021 for corresponding French Patent Application No. 2011213, 7 pages.

* cited by examiner

*Primary Examiner* — Beemnet W Dada
(74) *Attorney, Agent, or Firm* — Locke Lord LLP

(57) ABSTRACT

A method for protecting the execution of a software module having at least one protected function, the method including: obtaining a digital identifier of the electronic controller; calculating, by way of a calculation function contained in the software module, a digital signature on the basis of the digital identifier; comparing the calculated digital signature with a predefined signature stored in the software module; authorizing the execution of the protected function if the calculated digital signature corresponds to the predefined digital signature, and declining to execute the protected function if the calculated digital signature does not correspond to the predefined digital signature.

15 Claims, 4 Drawing Sheets

PROTECTION METHOD, COMPUTER PROGRAM PRODUCT AND ASSOCIATED SYSTEMS

TECHNICAL FIELD

The present description relates to electricity distribution grids, such as microgrids. However, the invention is not limited to the sole case of microgrids, and could advantageously be applied in control devices for other types of industrial installation.

BACKGROUND

Microgrids are generally used in residential, commercial or industrial buildings, or even in groups of buildings, to locally produce and store electricity, while also being able to be connected to a public electricity distribution grid.

Microgrids make it easier to use distributed energy sources, and more particularly to use renewable energy sources, such as wind turbines, hydrokinetic turbines or photovoltaic panels. Microgrids may also comprise energy storage devices, such as batteries, and may also accommodate dynamic and reversible electrical loads, such as electric motor vehicles connected to a charging terminal. Microgrids may advantageously be used to provide a stable and continuous electricity supply when the public grid is not sufficiently reliable.

A control system typically makes it possible to control and to automate the operation of the microgrid, for example in order to connect or disconnect loads and/or electric power sources, for example in response to the occurrence of an electrical fault, or on the basis of the evolution of energy demand and/or on the basis of the availability of the power sources, or even when the microgrid is disconnected from the main grid.

This control is generally performed using a programmable logic controller connected to various elements of the microgrid, such as electrical protection devices, switching devices, with power sources and/or electrical loads, or other electrical or industrial equipment. This connection is created for example by way of a communication link, such as an industrial data bus or a local area network, or point-to-point links.

To this end, the programmable logic controller is programmed to perform numerous tasks that are necessary for the correct operation of the installation being monitored. The programmable logic controller is generally programmed by an installer using software libraries provided by a software publisher and/or by the manufacturer of the programmable logic controller.

These software libraries contain predefined software functions that are more often than not compiled, which the installer may use to prepare a computer program suited to the needs of the end client and to the specific features of the microgrid being monitored by the programmable logic controller.

However, for security reasons, it has become desirable to prevent the installer from duplicating certain functions contained in the provided software libraries and using them in other programmable logic controllers without authorization.

This is the case in particular for functions concerning critical functionalities of the programmable logic controller that, if they were to be used inappropriately or without the authorization of the manufacturer, could have adverse consequences, or even impact the correct operation of the installation being monitored.

There is therefore a need for methods and systems that are capable of preventing the unauthorized use of certain software functions in an electronic controller, and in particular in a programmable logic controller of an electrical installation.

SUMMARY

To this end, according to one aspect of the invention, a method for protecting the execution of a software module, this software module having at least one protected function, this method being implemented by the software module in an electronic controller following a request from the electronic controller aimed at executing said at least one protected function, this method comprising:
  obtaining a digital identifier of the electronic controller;
  calculating, by way of a calculation function contained in the software module, a digital signature on the basis of the obtained digital identifier;
  comparing the calculated digital signature with a predefined signature stored in the software module, the predefined digital signature having been inserted beforehand during the creation of the software module on the basis of the digital identifier of the industrial controller and by way of a calculation function analogous to the one contained in the software module;
  authorizing the execution of the protected function if the calculated digital signature corresponds to the predefined digital signature, and declining to execute the protected function if the calculated digital signature does not correspond to the predefined digital signature.

According to some advantageous but non-mandatory aspects, such a method may incorporate one or more of the following features, taken alone or in any technically permissible combination:
  the additional parameter is an operating duration, and the reference value of the additional parameter is a maximum operating duration.
  the method comprises a temporary inhibition phase, following booting of the electronic controller, during which execution of the protected function is authorized even if the calculated digital signature does not correspond to the predefined digital signature.
  the digital identifier of the electronic controller is obtained by way of a system function provided by the electronic controller.
  the digital identifier comprises a hardware identifier, such as a serial number, that uniquely identifies the electronic controller.
  the calculation function is a hash function.
  the electronic controller is a programmable logic controller.

According to another aspect, a method for generating a software module intended to be deployed on a target electronic controller, this method comprising:
  acquiring a digital identifier of the electronic controller,
  calculating a digital signature on the basis of the obtained digital identifier, the calculation being performed by way of a calculation function;
  recording the digital signature in the software module;
  recording, in the software module, software code configured, when it is executed by a processor of the target electronic controller, to prompt the processor to implement a method as described above.

According to another aspect, a software module, such as a computer program product, comprises software code configured, when it is executed by a processor of an electronic controller, to implement steps comprising:

obtaining a digital identifier of the electronic controller;

calculating a digital signature on the basis of the obtained digital identifier, by way of a calculation function contained in the software module;

comparing the calculated digital signature with a predefined signature stored in the software module;

authorizing the execution of the protected function if the calculated digital signature corresponds to the predefined digital signature, and declining to execute the protected function if the calculated digital signature does not correspond to the predefined digital signature.

According to another aspect, an electrical distribution installation, in particular an electricity distribution microgrid, comprises an electronic controller comprising a processor and a software module as described above.

According to another aspect, a system for generating a software module intended to be deployed on a target electronic controller is configured to implement a method comprising:

acquiring a digital identifier of the electronic controller, calculating a signature on the basis of the obtained digital identifier, the calculation being performed by way of a calculation function;

recording the signature in the software module;

recording software code as defined above in the software module.

BRIEF DESCRIPTION OF THE DRAWINGS

The invention will be better understood and other advantages thereof will become more clearly apparent in the light of the following description of one embodiment of a such a method, provided solely by way of example and given with reference to the appended drawings, in which.

DETAILED DESCRIPTION

Figure 1:
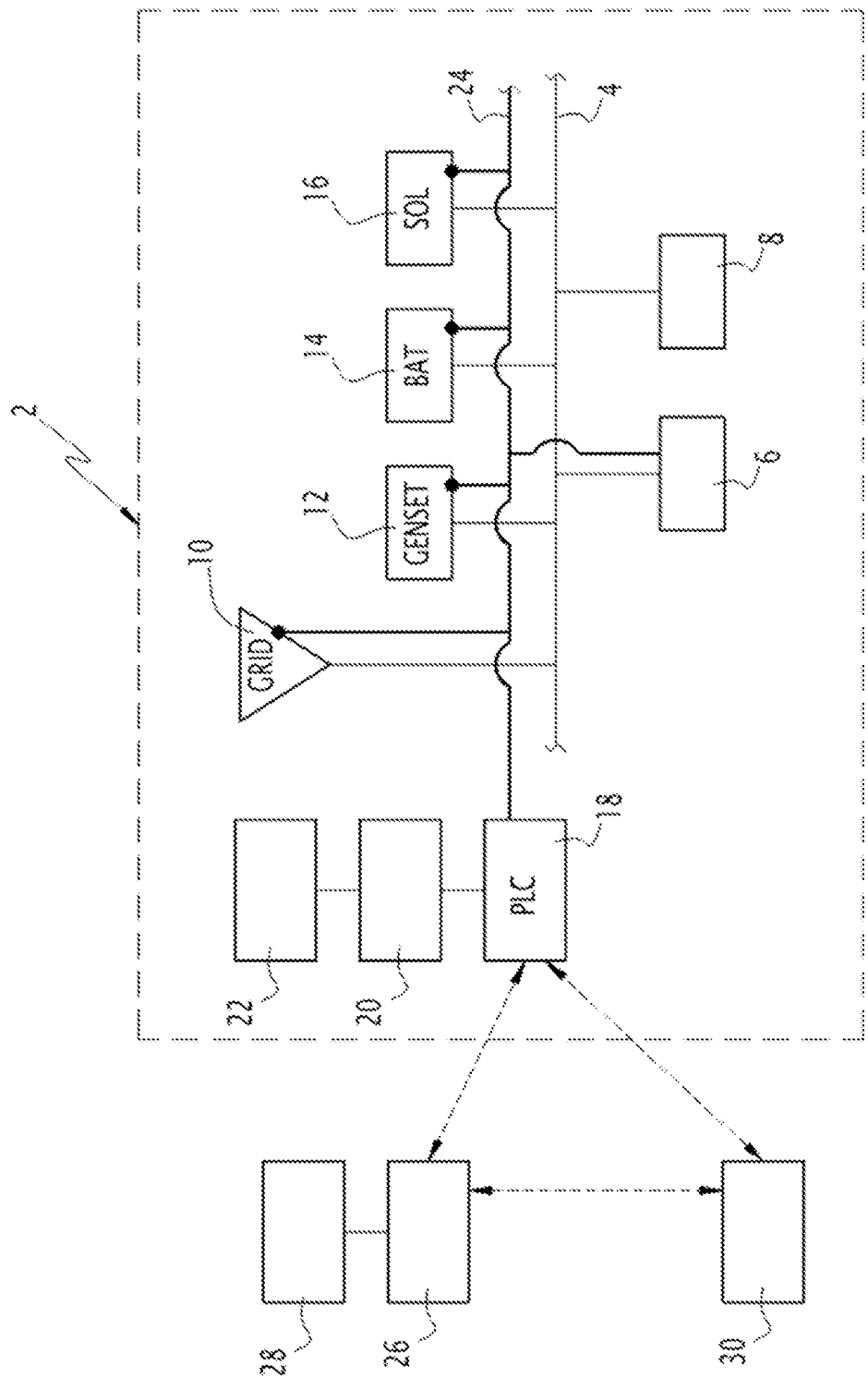
FIG. 1 is a schematic depiction of an example of an electrical distribution installation.

An example of an electricity distribution installation 2 is illustrated in FIG. 1.

In this example, the installation 2 is an electricity distribution microgrid, but, as a variant, it is conceivable for the installation 2 to be of a different type. It could for example be a conventional electricity distribution installation or an industrial installation. In this case, the embodiments described below may be transposed to such an installation.

In many embodiments, the microgrid 2 is an electricity distribution installation comprising electrical conductors 4 that make it possible to connect electrical loads 6, 8 and local electrical energy sources.

For example, the electrical loads 6, 8 and the electrical energy sources comprise electric power inputs and/or outputs that are connected to one or more electrical conductors 4, preferably via connection interfaces comprising one or more electrical switching devices and/or one or more electrical protection devices.

According to various embodiments, the microgrid 2 may be used to distribute DC electric currents or AC electric currents. As the case may be, the electric currents that are distributed may be single-phase or polyphase.

In many cases, the loads 6, 8 may be classified into two categories: a first group corresponding to dynamic or reversible electrical loads 6 that are able to be controlled and are able to be disconnected on demand, for example on demand from the microgrid 2, and a second group corresponding to electrical loads 8 that are not able to be disconnected on demand and/or that have to stay supplied with power at all times by the microgrid 2.

However, this distinction may be omitted in some embodiments. As a variant, the microgrid 2 could comprise electrical loads of just one of the two types presented above.

In many embodiments, the microgrid 2 may be connected to an electricity distribution grid 10 (denoted "GRID" in FIG. 1, and called "main grid" hereinafter), which may be a public grid.

The microgrid 2 may preferably be selectively connected to the grid 10 or disconnected from the grid 10, for example by way of remotely controllable electrical switching devices.

In many embodiments, the energy sources connected to the microgrid 2 are able to generate electricity, or to output stored electrical energy, or to convert electrical energy from another energy source, and may be active continuously or intermittently depending on their type. In practice, these electrical energy sources allow decentralized electricity production.

In the example illustrated, which is given primarily for explanatory purposes and which is not intended to limit the application just to this embodiment, the microgrid 2 comprises a conventional generator 12 (denoted "GENSET" in FIG. 1), an energy storage device 14 (denoted "STOR") and a renewable energy source 16 (denoted "SOL").

The conventional generator 12 may for example be a generator set, or a generator comprising a gas turbine, or a fuel cell.

The storage device 14 may comprise a battery, for example an electrochemical accumulator battery, and/or other electricity storage means, such as supercapacitor batteries, or kinetic energy storage devices, such as flywheels.

The renewable energy source 16 may for example comprise a solar panel, this solar panel being able to be combined with an inverter or with any appropriate electrical conversion equipment.

As a variant, the energy sources could include other electricity generation means based on what are known as renewable energies, such as wind turbines, or biomass boilers, or geothermally supplied generators, or hydraulic turbines, or any appropriate means.

It is easily conceivable in practice for the number and type of the electrical sources of the microgrid 2 to be able to be different from those described here, both in terms of their type and in terms of their number or their arrangement in the microgrid 2.

In many implementations, according to the circumstances, the microgrid 2 may be controlled so that at least some of the electrical energy produced by the local sources is transmitted to the grid 10.

When necessary, the microgrid 2 may also be controlled so that electrical energy from the grid 10 is used to supply all or some of the electrical loads 6, 8, for example when the production of electricity within the microgrid 2 by the local sources is insufficient to meet local demand.

In many embodiments, the microgrid 2 also comprises electrical devices for managing and regulating the electric power flowing in the microgrid 2, such as electrical protection devices and/or switching devices and/or power converters.

The microgrid 2 may also comprise sensors and/or measuring devices configured to measure electrical variables (voltages, currents, active and reactive electric powers, etc.) or environmental variables (temperature, humidity, etc.).

These switching devices, like the loads and the electrical sources, may be controlled so as to ensure the stability (in terms of frequency and/or in terms of voltage) of the microgrid 2. For example, depending on measured operating conditions and/or imposed operating policies, instructions may be sent to the equipment, for example to vary the consumed electric power or the produced electric power, or to vary a reactive electric power.

The microgrid 2 may furthermore be configured to detect the occurrence of an electrical fault and, in response, to disconnect all or some of the electric power sources and/or the electrical loads in order to protect the installation and/or to make it possible to isolate the fault and/or to locate the origin of the fault.

In general, the microgrid 2 comprises a control system comprising at least one electronic controller 18, such as a programmable logic controller (or PLC).

For example, the control system also comprises a user terminal 20 connected to the controller 18 and comprising a user interface 22.

In many embodiments, the user terminal 20 is a computer, such as an industrial computer or a workstation.

The user interface 22 is for example capable of displaying a graphical interface, and may comprise data entry instruments such as a keypad, a pointer, a touchscreen, a mouse or any equivalent element.

The user interface 22 may also comprise one or more data acquisition devices, such as a disc reader, or a wired connector, or a wireless communication interface, for downloading data from another local device, such as a mobile device carried by the operator.

The electronic control device (and more particularly the controller 18) is connected to at least some of the electrical equipment of the microgrid 2 via a communication link 24.

The communication link 24 may comprise a wired network, or a data bus, in particular an industrial data bus, or a plurality of point-to-point links, or else wireless links.

According to one example given for illustrative purposes, the communication link 24 may comprise a Modbus data bus, but other alternatives could be used as a variant.

In practice, the communication link 24 may be used by the controller 18 to send orders aimed at connecting or disconnecting certain equipment of the microgrid 2.

The link 24 may also be used to transmit, to the controller 18, data measured by sensors, or data generated by the connected equipment, and relating to measured electrical variables and/or information about the internal state of equipment of the microgrid 2.

According to some modes of implementation, the controller 18 comprises a processor, such as a programmable microcontroller or a microprocessor, and a memory forming a computer-readable data recording medium.

For example, the memory is a read-only memory (ROM), or a random-access memory (RAM), or a non-volatile memory such as an EPROM, or EEPROM, or FLASH, or NVRAM, or equivalent, or an optical or magnetic recording medium, or any appropriate technology.

The memory in this case comprises executable instructions or software code modules that are preferably designed to allow the microgrid 2 to perform operations required for it to operate, and in particular to implement methods as described in the following examples when these instructions are executed by the processor.

In many embodiments, the executable instructions or the software code modules are compatible with the IEC 61131 standard, part 3.

The use of the term "processor" does not rule out, as a variant, at least some of the functions of the controller 18 being performed by a signal processing processor (DSP), or a reprogrammable logic component (FPGA), or an application-specific integrated circuit (ASIC), or any equivalent element.

The control device (and in particular the controller 18) may comprise a communication interface for communicating, for example through a computer network such as the Internet, with a remote computer terminal 26, such as a computer, or a workstation, or a mobile communication device such as a digital tablet, or any equivalent device, this terminal 26 being able to be used to configure the microgrid or to monitor it remotely.

The terminal 26 may comprise a user interface 28, for example analogous to the user interface 22, while being capable of displaying a graphical interface and possibly comprising data entry and/or data acquisition instruments.

The control device (and in particular the controller 18), like the terminal 26, may also communicate with a remote computer server 30, in this case too for example through a computer network such as the Internet.

For example, the terminal 26 and the server 30 each comprise one or more processors configured to implement all or some of the steps described below.

The use of the term "computer server" does not prevent, in some embodiments, the corresponding functionalities of the server being implemented by a software service hosted on a "cloud computing" platform.

Figure 2:
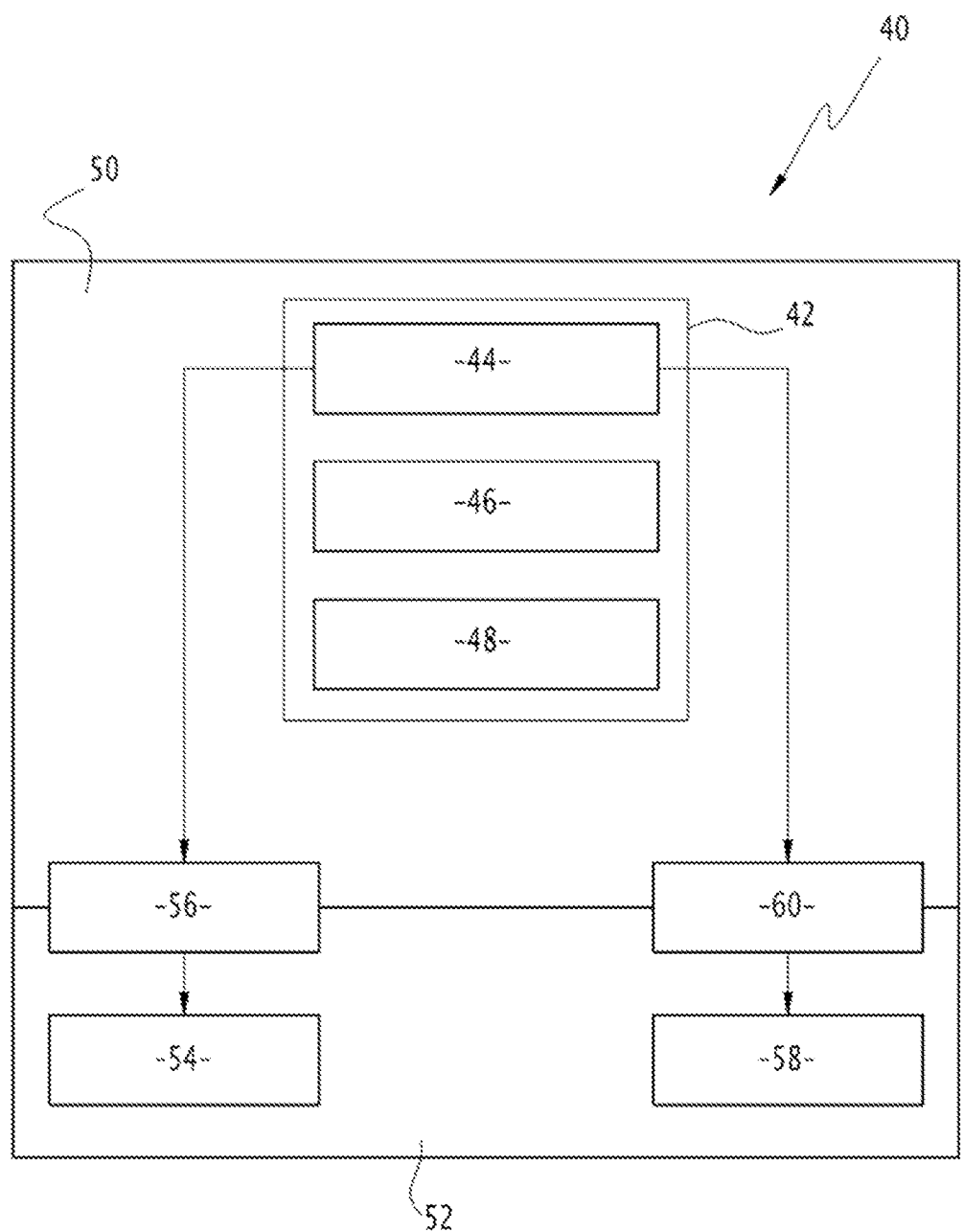
FIG. 2 is a simplified diagram of a software module used by a control device for the electrical distribution installation of FIG. 1.
Figure 3:
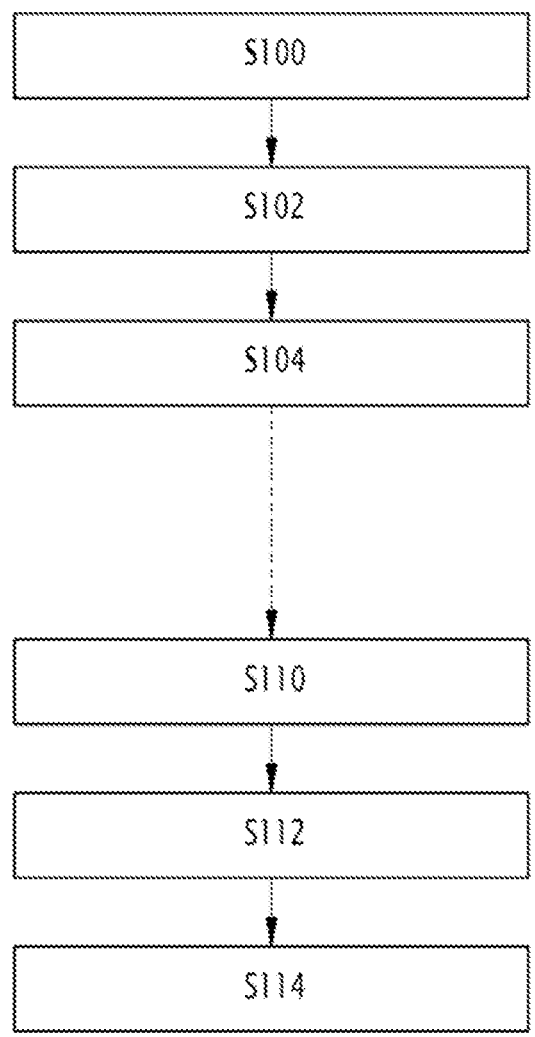
FIG. 3 is a diagram of an implementation of a method for creating a software module, such as the software module of FIG. 2.
Figure 4:
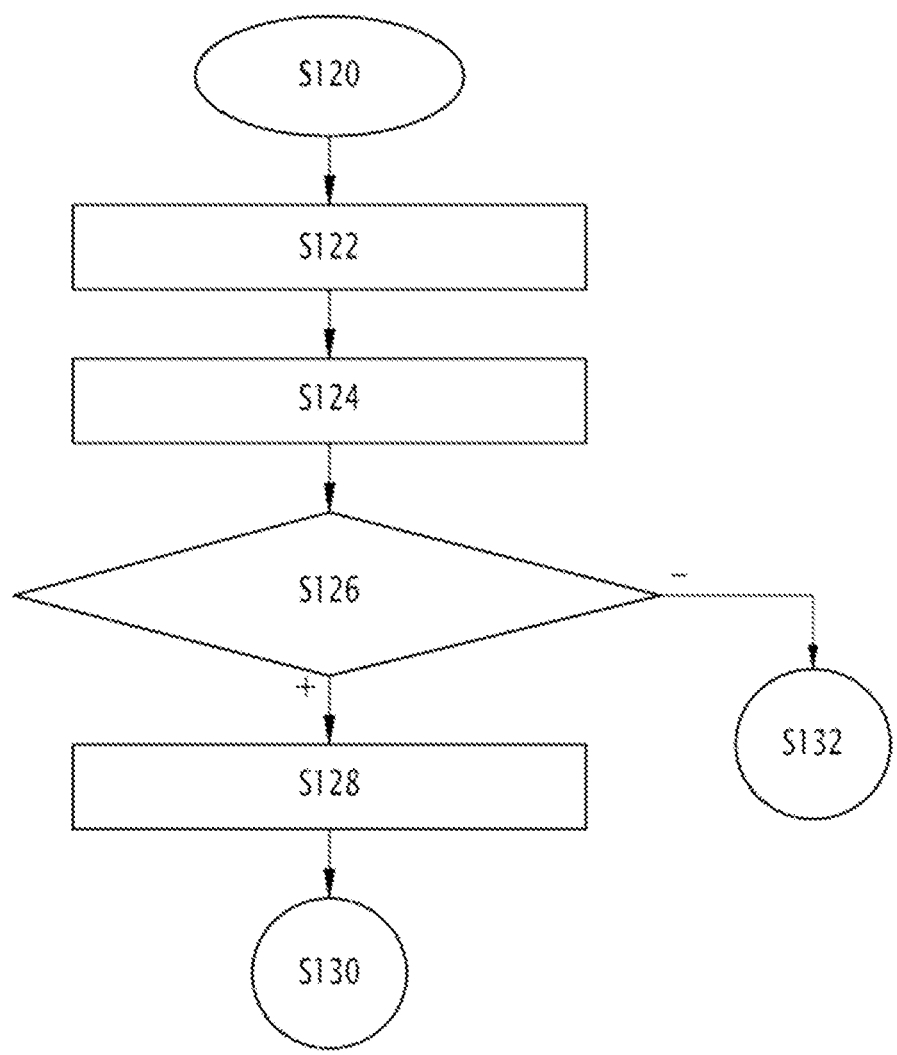
FIG. 4 is a diagram of an example of an implementation of a method for protecting a function of a software module, such as the software module of FIG. 2.

Some aspects of the invention relate more particularly to methods for securing the execution of a function contained in a software program executed by the controller 18, as illustrated by FIGS. 2, 3 and 4.

FIG. 2 schematically shows a software environment 40 of the controller 18, such as an operating system, and a software module 42.

A software module 42 is able to be executed by the processor of the controller 18.

In practice, the software module 42 implements one or more functionalities or routines able to be executed by the controller 18 in order to perform operations for automatically controlling the installation 2, in particular in order to automatically control the microgrid.

For example, the software module 42 comprises executable instructions or compiled computer code. The executable instructions or the software code modules are preferably in accordance with the IEC 61131 standard—part 3, although other examples are possible in practice.

According to many embodiments, the software module 42 comprises:
  control instructions (block 44),
  instructions for implementing at least one function, called a protected function (block 46), and
  a data storage area (block 48), possibly for example comprising values of one or more parameters.

In practice, the software module 42 also comprises instructions for implementing at least one unprotected function, although this is not shown expressly in FIG. 2.

For example, in the sense of the present description, a "protected function" denotes one or more software functions or methods for which it is desirable for them to be able to be used only by users who have received authorization to do so, for example by allowing them to be executed only on one or more previously authorized controllers 18.

For example, the protected function 46 may implement one or more algorithms that the publisher of the software module 42 or the manufacturer of the controller 18 or of the microgrid 2 does not wish to disclose or for which dissemination should be restricted, or else to avoid unauthorized duplication of these algorithms by an installer or by the end client.

The control instructions 44 are for example configured to restrict the execution of the functions 46, that is to say to authorize execution thereof only in authorized cases, as will be understood upon reading the examples presented in the remainder of the description. In other words, the control instructions 44 make it possible to implement a mechanism for managing digital rights in order to protect the execution of the protected functions 46 and to selectively prohibit execution thereof in certain cases.

Preferably, the control instructions 44 are not able to be modified by a user when the software module 42 is loaded into the controller 18 (and in particular when the software module 42 is currently being executed in the environment 40).

By opposition, a function called an unprotected function in this case denotes one or more software functions or methods that may normally be implemented on a controller 18.

For example, the protected functions 46 may relate to one or more of the following functionalities implemented by the controller 16 in order to control the installation 2, in particular when the installation 2 is a microgrid:
- functions for protecting the electrical devices or equipment (the electrical loads, the electrical sources, etc.) against the occurrence of electrical faults;
- functions aimed at ensuring the stability of the grid (in terms of voltage and in terms of frequency), in particular in order to ensure balancing between the electrical loads and the electrical sources;
- functions aimed at ensuring the operation and the stability of the microgrid 2 when it is disconnected from the main grid 10;
- functions aimed at ensuring the transition and stability of the microgrid when the microgrid 2 is connected to the main grid 10.

In many embodiments, the software environment 40 is shared between a first area 50 in which functions and programs may be executed and a second area 52, such as an operating system kernel, which comprises functions and routines associated with software resources and/or hardware resources that are not directly accessible to a user or to a program launched by the user.

For example, identification data (block 54) relating to a digital identifier of the controller 18, illustrated here in the area 52, may be accessible to the software module 42 only via a first system function 56.

In this case, the control instructions 44 advantageously comprise routines for calling the first system function 56 in order to request access to the identification data 54.

The information from the module 54 thus cannot be altered by the user or by a program outside the software module 42. This makes it possible to prevent the user from bypassing the protection mechanism implemented by the control instructions 44.

In many examples, the digital identifier comprises a hardware identifier, such as a serial number, that uniquely identifies the controller 18. Other embodiments are possible, however.

In practice, the digital identifier may comprise a number, or an alphanumeric or hexadecimal character string, or symbols, or any appropriate representation.

Optionally, the controller 18 (or the system 40) may comprise a software module 58 for counting down a duration, for example an operating duration of the controller 18. The module 58 for example comprises a clock or a time counter. The module 58 is preferably accessible to the software module 42 only via a second system function 60.

In this case too, the information from the module 58 thus cannot be altered by the user or by a program outside the software module 42.

In this case, the control instructions 44 may advantageously comprise routines for calling the second system function 60 in order to request access to the data measured by the module 58, such as an operating duration of the controller 18.

In general, the software module 42, and more particularly the control instructions 44, are configured, when they are executed by the processor of the controller 18, to implement steps of:
- obtaining a digital identifier of the electronic controller;
- calculating a digital signature on the basis of the obtained digital identifier, by way of a calculation function contained in the software module;
- comparing the calculated digital signature with a predefined signature stored in the software module, the predefined digital signature having been inserted beforehand during the creation of the software module on the basis of the digital identifier of the industrial controller and by way of a calculation function analogous (or identical) to the one contained in the software module;
- authorizing the execution of the protected function if the calculated digital signature corresponds to the predefined digital signature, and declining to execute the protected function if the calculated digital signature does not correspond to the predefined digital signature.

Other ways of implementing the system 40 and/or the software module 42 are possible. In particular, multiple protected functions analogous to the protected function 46 could be embedded in the software module 42, access to these protected functions being able to be controlled by the control instructions 44, or by control instructions that may be dedicated thereto.

For the sake of facilitating the disclosure of the invention, only one protected function is described in these examples, but the embodiments described below for protecting the execution of a protected function 46 may be transposed to variants comprising multiple functions to be protected.

FIG. 3 shows an example of a method for creating (or generating) a software module such as the software module 40, this software module being intended to be deployed on a target electronic controller, for example on the controller 18.

This method is for example implemented prior to the compilation of the software module 42.

The creation method is preferably implemented on the terminal 26, for example by way of a configuration system such as a software development environment or an online configuration tool, this system being able to be installed locally on the terminal 26 and/or to be implemented at least partially by the server 30.

Typically, in many examples, a user may develop a computer program intended for the controller 18 by programming one or more algorithms on the basis of software functions defined beforehand in libraries of functions or in advanced programming interfaces (API) that may be made available by a software publisher and/or by a manufacturer of the controller 18.

This allows the users in particular to adapt and to customize the control algorithms and the computer programs used to control the installation 2 based on the characteristics and the specific features of this installation 2.

Among the functions that are made available, the program may have to use protected functions. At least part of the purpose of the method for creating the software module is therefore to generate the control instructions 44 that will make it possible to restrict the execution of the protected functions 46 once the software module has been compiled and installed on the controller 18. It will therefore be understood that the software module 42 may be customized based on the controller 18 for which it is intended.

In a step S100, a digital identifier of the target electronic controller is acquired. For example, the identifier is provided by the user, by inputting it on an interface of the system or by loading it from a data storage medium.

In a step S102, a digital signature is calculated automatically on the basis of the provided digital identifier. The digital signature is calculated by way of a predefined calculation function, for example within the terminal 26 or the server 30. For example, the calculation function forms part of the development system.

In some preferred embodiments, the calculation function is a hash function. Other implementations may however be provided as a variant.

In a step S104, the digital signature may be recorded in the software module, for example in the storage area 48 (or in a temporary storage area that will become the storage area 48 once the software module 42 has finished being compiled).

Next, an executable software module, such as the software module 42 described above, is created. For example, in a compilation step, software code is generated automatically which, when it is executed by a processor of the target electronic controller, is configured to prompt the processor to implement a method as described with reference to FIG. 4.

The compilation step is not necessarily implemented by the terminal 26 or by the server 30. In the example illustrated, this step is implemented locally in the installation 2, in the local control terminal 20 (or "edge controller"), for example in an installation phase implemented by an installer.

Thus, in a step S110, the terminal 20 automatically receives the data generated at the end of steps S100 to S104 described above. These data may comprise the software module 42 in a partially compiled form. The compilation is then implemented in step S112, so as to create the software module 42. Finally, in a step S114, the software module is installed on the controller 18.

Other variants may however be contemplated, for example in which compilation step S112 is implemented by the terminal 26 or the server 50. The terminal 20 may then be omitted, as may its interface 22.

FIG. 4 shows an example of a protection method implemented by the control instructions 44 during the execution of the software module 42 on the controller 18.

Initially, in a step S120, the controller 18 is booted.

The method is implemented in response to a request from the controller 18 (for example from a program currently being executed on the controller 18) requesting the execution of a protected function 46 contained in the software module 42.

In a step S122, a digital identifier of the electronic controller is obtained automatically, for example by calling the first system function 56.

In a step S124, a digital signature is calculated automatically on the basis of the obtained digital identifier. The digital signature is calculated by way of a calculation function contained in the software module, for example contained in the control instructions 44.

In practice, this calculation function is analogous, and preferably identical, to the calculation function used during the creation of the software module 42 (here in step S102).

In a step S126, the calculated digital signature is compared with a predefined signature stored in the software module 42, for example stored in the storage area 48 of the software module 42.

The predefined digital signature in fact corresponds to the digital signature calculated during the creation of the software module 42 and that was inserted beforehand during the creation of the software module (here in step S102).

Depending on the result of the comparison, if the calculated digital signature corresponds to the predefined digital signature, then the execution of the protected function is authorized (step S128). The instructions corresponding to the protected function 46 may then be executed by the processor of the controller 18.

The method may then end (step S130) until the next execution thereof upon the next call to a protected function 46 of the software module 42.

By contrast, the result of the comparison, if the calculated digital signature does not correspond to the predefined digital signature, then the execution of the protected function is declined (step S132). For example, access to the instructions corresponding to the protected function 46 is then prohibited and these instructions cannot be executed by the processor of the controller 18. The method may end until the next execution thereof upon the next call to a protected function 46 of the software module 42.

Optionally, in step S132, an error signal may be generated with a view to being processed by the system 40, for example in order to record the occurrence of the fault in an event log, or to transmit the error signal to an exception manager, or to send an alert to a supervisor.

In many embodiments, in step S126, the calculated digital signature is said to correspond to the predefined digital signature if the calculated digital signature is equal to the predefined digital signature. This is the case in particular when the digital signatures are numerical or alphanumeric values.

According to some advantageous but nevertheless optional variants, the method may also comprise:
- a step of acquiring an additional parameter from the electronic controller (for example during step S122);
- and then a step of comparing (for example during step S126) the acquired additional parameter with a reference value of the additional parameter, stored in the software module (for example stored in the area 48).

Furthermore, execution of the protected function is authorized only if, in addition, the acquired additional parameter corresponds to the reference value, execution of the protected function being declined if the acquired additional parameter does not correspond to the reference value. In other words, in this variant, the conditions required to authorize the execution of the protected function are cumulative.

According to one advantageous example, the additional parameter is an operating duration, and the reference value of the additional parameter is a maximum operating duration.

For example, this may be the operating duration of the software module 42, or the operating duration of the controller 18, or the operating duration of the installation 2.

This makes it possible for example to prevent the user from continuing to use the software module 42 and the protected functions 46 indefinitely after a usage license has expired.

In practice, the reference value of the additional parameter may be stored in the storage area 48. And the value of the additional parameter may be acquired by calling a system function (for example the second system function 60).

In other embodiments that are not described in detail, the additional parameter could be different. It could be a digital license key, or an equivalent parameter indicating whether a usage license granted to the user is still valid.

According to some advantageous but nevertheless optional variants, the method may also comprise a temporary inhibition phase, following booting of the controller 18, during which execution of the protected function 46 is authorized even if the calculated digital signature does not correspond to the predefined digital signature.

For example, following booting (step S120), the control instructions 44 temporarily inhibit the implementation of steps S122, S124 and S126.

The inhibition is preferably activated temporarily for a short duration following booting of the controller 18 or booting of the module 42. The inhibition duration should remain short enough to prevent a user from freely using the protected function 46 or from bypassing the protections put in place by the control instructions 44. For example, the inhibition duration is less than or equal to a few minutes, or a few seconds.

This inhibition allows for example a user to perform diagnostic and maintenance operations without being hampered by the protection mechanism implemented by the control instructions 44.

In many cases, however, the temporary inhibition phase may be omitted.

As a variant, the steps of the methods described above could be carried out in a different order. Certain steps could be omitted. The described example does not prevent, in other embodiments, other steps from being implemented conjointly and/or sequentially with the described steps.

The embodiments presented above make it possible overall to prevent the unauthorized use of certain software functions in a programmable logic controller of an electrical installation. By authorizing the execution of protected functions only on one or more controllers 18 that are identified and authorized beforehand, users and third parties are prevented from copying or duplicating the software module 42 without authorization.

And, by limiting the protection to only certain functions of the software module 42, rather than protecting the entire software module, the implementation of the protection mechanism is simplified. This also makes it easier for users to work when writing the program before compiling the software module 42.

The protection mechanism implemented by the control instructions 44 is easier to implement and more transparent for the user than known software protection mechanisms, in which the entire software program is protected by way of hardware and software devices, for example by way of a dedicated electronic device that has to remain connected to the controller 18.

The embodiments and the variants contemplated above may be combined with one another so as to create new embodiments.

The invention claimed is:

1. A method for protecting execution of a software module, the method, implemented by control instructions of the software module, comprising:
    responsive to a request from an electronic controller of an electricity distribution installation to execute at least one protected function, obtaining a digital identifier of the electronic controller, the software module being compiled and installed in the electronic controller and including the at least one protected function, the control instructions, and at least one nonprotected function;
    calculating, by way of a calculation function contained in the software module, a digital signature on the basis of the obtained digital identifier;
    comparing the calculated digital signature with a predefined signature stored in the software module, the predefined digital signature having been inserted beforehand during the creation of the software module on the basis of the digital identifier of the electronic controller and by way of a calculation function analogous to the one contained in the software module; and
    authorizing the execution of the protected function if the calculated digital signature corresponds to the predefined digital signature, and declining to execute the protected function if the calculated digital signature does not correspond to the predefined digital signature, wherein execution of the at least one nonprotected function is noncontingent on the digital identifier of the electronic controller.

2. The method according to claim 1, further comprising:
    acquiring an additional parameter from the electronic controller;
    comparing the acquired additional parameter with a reference value of the additional parameter, stored in the software module,
    and wherein execution of the protected function is authorized only if, in addition, the acquired additional parameter corresponds to the reference value, execution of the protected function being declined if the acquired additional parameter does not correspond to the reference value.

3. The method according to claim 2, wherein the additional parameter is an operating duration, and wherein the reference value of the additional parameter is a maximum operating duration.

4. The method according to claim 1, further comprising a temporary inhibition phase, following booting of the electronic controller, during which execution of the protected function is authorized even if the calculated digital signature does not correspond to the predefined digital signature.

5. The method according to claim 1, wherein the digital identifier of the electronic controller is obtained by way of a system function provided by the electronic controller.

6. The method according to claim 1, wherein the digital identifier comprises a hardware identifier that uniquely identifies the electronic controller.

7. The method according to claim 1, wherein the calculation function is a hash function.

8. The method according to claim 1, wherein the electronic controller is a programmable logic controller.

9. A method for generating a software module intended to be deployed on a target electronic controller, the method comprising:
acquiring a digital identifier of the electronic controller,
calculating a signature on the basis of the obtained digital identifier, the calculation being performed by way of a calculation function;
recording the signature in the software module;
recording, in the software module, software code configured, when executed by a processor of the target electronic controller, to cause the processor to implement the method according to claim 1.

10. A non-transitory computer readable medium having stored thereon a software module comprising software code having control instructions, the control instructions being configured, when executed by a processor of an electronic controller of an electricity distribution installation, to implement a method comprising:
responsive to a request from the electronic controller of an electricity distribution installation to execute at least one protected function, obtaining a digital identifier of the electronic controller, the software module further including the at least one protected function and at least one nonprotected function;
calculating, by way of a calculation function contained in the software module, a digital signature on the basis of the obtained digital identifier;
comparing the calculated digital signature with a predefined signature stored in the software module;
authorizing the execution of the protected function if the calculated digital signature corresponds to the predefined digital signature, and declining to execute the protected function if the calculated digital signature does not correspond to the predefined digital signature, wherein execution of the at least one nonprotected function is noncontingent on the digital identifier of the electronic controller.

11. An electricity distribution installation, comprising an electronic controller comprising a processor and the software module of the non-transitory computer readable medium according to claim 10.

12. A system for generating a software module intended to be deployed on a target electronic controller, the system being configured to implement a method comprising:
acquiring a digital identifier of the electronic controller,
calculating a digital signature on the basis of the obtained digital identifier, the calculation being performed by way of a calculation function;
recording the digital signature in the software module;
recording the software code of the software module of the non-transitory computer readable medium according to claim 10 in the software module.

13. The method according to claim 6, wherein the hardware identifier comprises a serial number.

14. The electricity distribution installation according to claim 11, wherein the electricity distribution installation is an electricity distribution microgrid.

15. The method according to claim 5, wherein the digital identifier is stored in an area of memory of the electronic controller that is inaccessible to a user directly or via a program launched by the user, and is accessible to the software module only via a system function of the electronic controller, wherein the control instructions include one or more routines for calling the system function in order to request access to the digital identifier.

* * * * *